F. A. EASTON.
PRESSURE CORRECTING DEVICE FOR HIGH PRESSURE GAS METERS.
APPLICATION FILED OCT. 3, 1919.

1,355,075.

Patented Oct. 5, 1920.

F. A. Easton
INVENTOR

F. A. EASTON.
PRESSURE CORRECTING DEVICE FOR HIGH PRESSURE GAS METERS.
APPLICATION FILED OCT. 3, 1919.
1,355,075.
Patented Oct. 5, 1920.
2 SHEETS—SHEET 2.
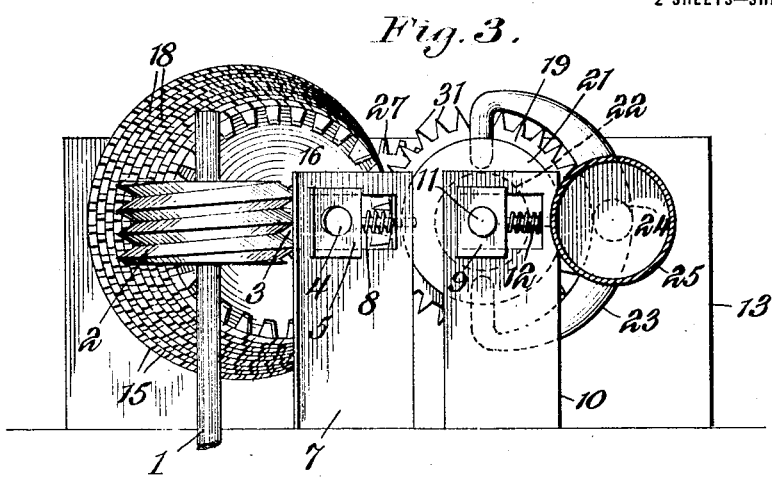
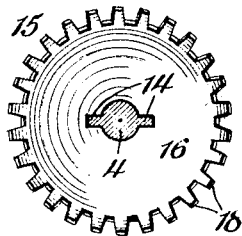
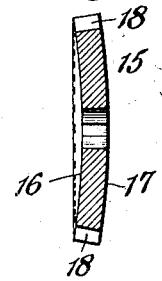
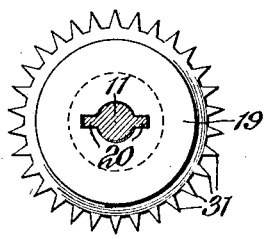
F. A. Easton
INVENTOR
WITNESSES
BY
ATTORNEY

UNITED STATES PATENT OFFICE.

FRANK ADELBERT EASTON, OF BAKERSFIELD, CALIFORNIA, ASSIGNOR OF ONE-THIRD TO JAMES R. DIBBLE, OF BAKERSFIELD, CALIFORNIA.

PRESSURE-CORRECTING DEVICE FOR HIGH-PRESSURE GAS-METERS.

1,355,075.   Specification of Letters Patent.   Patented Oct. 5, 1920.

Application filed October 3, 1919. Serial No. 328,109.

*To all whom it may concern:*

Be it known that I, FRANK A. EASTON, a citizen of the United States, residing at Bakersfield, in the county of Kern and State of California, have invented a new and useful Improvement in Pressure-Correcting Devices for High-Pressure Gas-Meters, of which the following is a specification.

This invention has reference to pressure correcting devices for high pressure gas meters, and its object is to provide means which will automatically compensate for changing pressure and thereby correctly measure the gas or other fluid flowing through the meter.

In accordance with the invention an indicator is provided so as to move across a suitable dial and this indicator, which may be in the form of a hand or pointer, is under the control of a motor receiving its impulses from the gas flowing through the meter. There are also provided a pressure responsive means and a compensating mechanism, the latter being located between the gas responsive motor and the indicator driven thereby.

The compensating mechanism responsive to the pressure is so arranged that as the pressure increases or decreases, the rate of movement between the gas driven mechanism and the dial pointer correspondingly varies, wherefore, the recording needle or needles will indicate the proper measurement of gas instead of a measurement out of correspondence with the actual consumption.

The invention will be best understood from a consideration of the following detailed description, taken in connection with the accompanying drawings forming part of this specification with the understanding, however, that the invention is not confined to any strict conformity with the showing of the drawings but may be changed and modified so long as such changes and modifications mark no material departure from the salient features of the invention as expressed in the appended claims.

In the drawings:—

Fig. 3 is an end elevation as viewed from the left hand side of Fig. 1.

Figs. 4 to 7 are views of different details of the construction.

Figure 1:
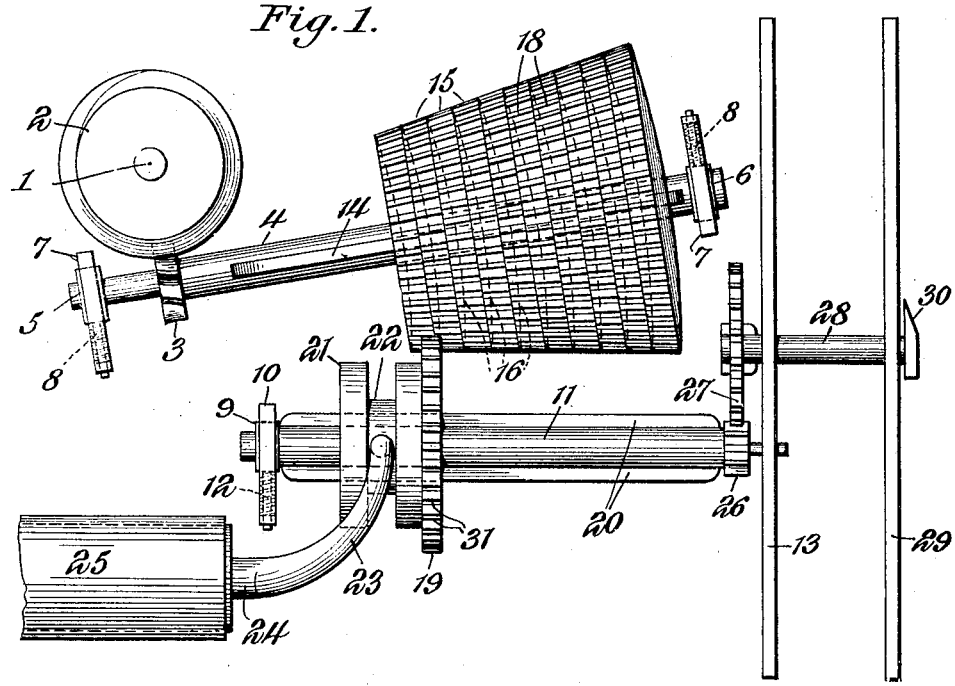
Figure 1 is a plan view of apparatus embodying the invention.
Figure 2:
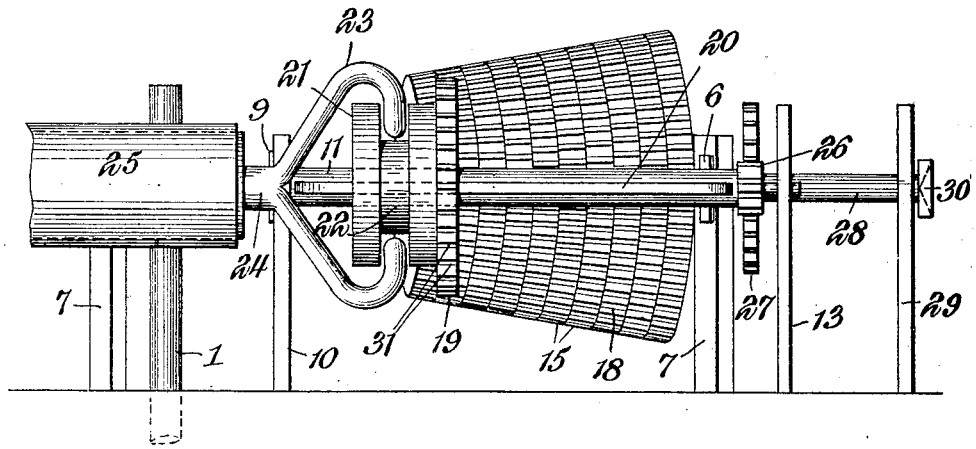
Fig. 2 is a side elevation thereof.

In the drawings no attempt has been made to show the meter itself, since such structure does not form part of the invention, which latter is in the nature of an attachment or intermediary between the gas-driven part of the meter and the indicator, usually in the form of a dial structure, and these parts of the apparatus may be of known construction.

Mounted on a shaft 1, forming part of or connected to the gas driven part of the meter, is a worm 2 meshing with a worm wheel 3 fast on a shaft 4 having journal bearings 5, 6, near opposite ends. The journal bearings 5 and 6 are carried by posts 7, which may be considered as erected on any suitable support. The bearings 5 and 6 are mounted to slide in the posts 7 and are urged in one direction by springs 8 tending to cause the shaft 4 to move bodily, the tendency being to move one end of the shaft in one direction and the other end in the opposite direction.

Mounted in another journal bearing 9 carried by a post 10 is another shaft 11, the bearing 9 being urged in one direction by a spring 12. The other end of the shaft 11 from that journaled in the journal bearing 9 is journaled in a plate or support 13, the journal bearing being such as to permit a slight play to compensate for the yieldability of the journal bearing 9.

The shaft 4 is provided with a spline 14, which may be a double spline, as best shown in Fig. 5, although other means performing the office of the spline 14 may be employed. The shaft 4 carries a series of gear wheels 15, the series being made up of a suitable number of gear wheels with each wheel of the series progressively larger from one end of the series toward the other and these wheels are, or may be, in face to face contact or approximately so. These gear wheels are each dished or concave on one face, as indicated at 16, and correspondingly bulged or convex on the other face, as indicated at 17. Each gear wheel is provided with a peripheral series of gear teeth 18 conforming to the diametrical curvature of the gear wheel and the teeth of the several gear wheels are all alike in shape. The parts are so proportioned that each gear wheel contains one more tooth than the next smaller gear wheel. For instance, in a certain example which has been worked out, the smallest gear wheel of the series contains 29 teeth and the largest 58, the entire series containing 30 gear wheels. When assembled the gear wheels form a frusto-cone with the teeth conforming thereto. Mounted on the shaft 11 is a plane gear wheel 19, which may be considered as having 29 teeth, that is the same number of teeth as the smallest one of the series of gear wheels 15. The shaft 11 is provided with splines 20 which may be arranged on opposite sides of the shaft, although such arrangement is not obligatory. Mounted on the shaft 11 and fast to the gear wheel 19 is a spool 21 having a circumferential groove 22 in which engages a fork 23 on one end of a rod 24 issuing from a pressure responsive device 25 which may be of any suitable form and is assumed to be responsive to the pressure of the gas being metered. No attempt is made to show any particular construction of pressure responsive device, since such construction forms no part of the invention and there are some devices capable of use for the purpose. The function of the pressure responsive device 25 is to move the gear wheel 19 lengthwise of the shaft 11. The series or group of gear wheels 15 is a taper group and one side of the series is parallel with the shaft 11, with the axes of the shafts 4 and 11 at an angle corresponding to the taper of the group of gear wheels 15, so that the gear wheel 19 may be moved along the group of gear wheels 15 and will mesh with the wheels 15 in order, either advancing or receding. It is because of the taper form of the group of gear wheels 15 that the several gear wheels 15 are made respectively concave and convex on their opposite faces so that the gear teeth 18 mesh accurately with the teeth of the gear wheel 19 irrespective of the position of the gear wheel 19 along the group or series of gear wheels 15.

At the end of the shaft 11 adjacent to the plate 13 there is secured a pinion 26 meshing with a gear wheel 27 on an arbor 28 journaled in the plate 13 and an adjacent plate 29, which latter may constitute a dial plate. The arbor 28 is shown as provided with a hand or pointer 30 constituting indicating or registering means. It is to be understood, however, that this showing is of diagrammatic nature and is not intended to illustrate any particular indicating or registering means, for such means may follow the usual lines and may be far more refined than the drawings show.

The teeth or cogs 19 of the gear wheels 15 may be slightly rounded and the teeth of the gear wheel 19 may be more or less tapered or pointed, as shown at 31, Fig. 7. Such an arrangement facilitates the meshing of the teeth. To prevent interference of the teeth or jamming of the gear wheels 15 and 19 on the transfer of the gear wheel 19 from a gear wheel 15 to the next one in order, the alternate gear wheels 15 are mounted loosely on the shaft. This is accomplished by providing the loose gear wheels 15 with a sufficiently large key-way to permit a play of about one tooth, while the other gear wheels are tight on the shaft 4. By way of example it may be assumed that the loose gear wheels are the second, fourth, sixth, etc., of the series. Furthermore, it is to be understood that a particular number of teeth in the gear wheels 15, as hereinbefore mentioned, is not at all obligatory, since where the conditions to be met are different from those for which the particular arrangement given would answer, the number of teeth employed must correspondingly change.

If it be assumed that in a compensating mechanism having proportions such as have been stated, the gear wheel 19 is initially in mesh with the first or smallest gear wheel 15, then the movement of the pointer 30 will bear a certain relation to that of the shaft 1 and the quantity of gas or other fluid metered will be that furnished at the pressure under which the gear wheel 19 will be in mesh with the smallest one of the gear wheels 15. If the fluid pressure increases, the pressure responsive device 25 will then force the gear wheel 19 along the shaft 11 to a corresponding extent, causing the gear wheel 19 to mesh with the next larger gear wheel 15 in order, and if the pressure still further increases the gear wheel 19 will be carried along the series of gear wheels 15 correspondingly. Such action continues within the range of the compensating mechanism until, when the gear wheel 19 has reached the limit of its travel toward the large end of the group of gear wheels 15, the rotative speed of the gear wheel 19, in the particular example given, will be double that of the gear wheel 19 when in mesh with the smallest one of the gear wheels 15. As the gear wheel 19 is moved from one gear wheel 15 to the next in order the difference in the number of teeth in the adjacent gear wheel 15 would tend to cause a jamming of the teeth were it not for the give of one of the two adjacent gear wheels 15 with which the gear wheel 19 is at the time in mesh.

The correction device for high pressure can be used for any pressure base by changing the number of teeth in the gears. The particular number of gears and teeth given in the description is for a correcting device for a four ounce base, and of course can be used for other fluids than gas. Any error caused by the gear wheel 19 on the shaft 11, which may be termed the secondary shaft, not meshing with the gear 15 on the shaft 4, which latter may be termed the primary shaft, may be in large measure eliminated by proportioning the worm 2 to the worm pinion 3 so that the shaft 4 and gears thereon will rotate at a higher speed than they should and then gearing the secondary shaft down to the index or pointer in the same ratio. When the rotation of the primary shaft is thereby increased the chance of the gear 19 meshing properly is correspondingly increased.

To overcome any chance of the sliding gear 19 on leaving one gear 15 for the next, staying there and causing trouble in the meshing on account of being on two gears each having a different number of cogs or teeth from the other, the yieldable bearings, before described, are provided. The amount of yielding is made sufficient so that the gears will slip over without causing a strain and possible breakage.

What is claimed is:

1. A high pressure gas or other fluid meter provided with a fluid driven shaft, a series of gear wheels thereon with progressively changing members of gear teeth or cogs, another shaft with a gear wheel slidable thereon, indicating means connected to and driven by the second shaft, and means connected to the last named gear wheel and responsive to the pressure of the fluid being measured to shift said second named gear wheel from one gear wheel to the next of the series of gear wheels, whereby the relative movement from the driving part of the mechanism to the driven part thereof will correspond to the variations in pressure of the gas or other fluid to be measured.

2. A pressure correcting device for high pressure gas and other meters, comprising driving means constituting part of the meter, a shaft connected to the driving means for actuation thereby, a series of gear wheels in axial juxtaposition and progressively varying in the number of teeth or cogs thereon, a shaft mounted adjacent to the first named shaft and the gear wheels thereon, registering means driven by the second named shaft, and a gear wheel mounted on and movable lengthwise of the second named shaft to mesh with different ones of the gear wheels on the first named shaft, and means responsive to variations in the pressure of the gas to be measured for moving the gear wheel along the first named shaft.

3. In a pressure correcting device for high pressure gas or other fluid meters, a tapering series of gear wheels in close juxtaposition and having a common axis, driving connections between the meter and the series of gear wheels for the common actuation of the latter, an elongated shaft at one side of the series of gear wheels, indicating mechanism, connections between the elongated shaft and the indicating mechanism, a gear wheel mounted on a slidably elongated shaft for transmitting motion from the meter mechanism to the registering mechanism, and means responsive to variations in fluid pressure for moving the second named gear wheel into engagement with the different ones of the series of gear wheels.

4. In a pressure connecting device for meters, a tapering group of nesting gear wheels each convex on one face and concave on the opposite face with the number of teeth or cogs on the gears varying in accordance with the taper, said group of gears being connected to the driving side of the meter, another gear wheel slidable along the group of gear wheels to mesh therewith, and connected to the indicating mechanism of the meter, and means responsive to varying pressure of the fluid being measured to cause the shifting of the last named gear along the group of gear wheels in accordance with the variations in the pressure.

5. In a pressure correcting device for meters, a tapering group of gear wheels with the number of teeth or cogs of each gear wheel toward the large end of the group increasing progressively and each tooth rounded, and a single gear wheel movable along the tapering group to mesh therewith in order, and the last-named gear wheel having the teeth tapered or pointed toward the engaging end.

6. In a pressure correcting device for meters, a series of gear wheels mounted on a single shaft with the group of gear wheels tapering from one end toward the other and the number of teeth or cogs of the gear wheels progressively increasing toward the large end of the group, the alternate gear wheels being respectively tight on the shaft and having a limited looseness rotatively on the shaft.

7. In a pressure correcting device for meters, a series of gear wheels mounted on a single shaft with the group of gear wheels tapering from one end toward the other and the number of teeth or cogs of the gear wheels progressively increasing toward the large end of the group, the alternate gear wheels being respectively tight on the shaft and having a limited looseness rotatively on the shaft, and said gear wheels nesting, with the opposite faces respectively convex and concave.

8. In a pressure correcting device for meters, a tapering series of simultaneously rotatable juxtaposed gear wheels, and a single gear wheel mounted to move along and in mesh with the series of gear wheels, the series of and the single gear wheel having respective shafts carrying them, and elastically yieldable mountings for the shafts permitting the series of and the single gear wheel to move away from each other to avoid jamming.

In testimony that I claim the foregoing as my own I have hereto affixed my signature in the presence of two witnesses.

FRANK ADELBERT EASTON.

Witnesses:
MYRON BURR HOLMES,
J. GORDON HUSSEY.